United States Patent [19]

Mayo et al.

[11] 3,776,689

[45] Dec. 4, 1973

[54] APPARATUS FOR HEATING LOCALIZED AREAS OF PIPE

[75] Inventors: Frederick W. Mayo, Livonia, Mich.; Billy G. Spires, Kenai, Alaska; William M. Bockelman, Livonia, Mich.

[73] Assignee: Burners, Inc., Detroit, Mich.

[22] Filed: June 8, 1970

[21] Appl. No.: 44,427

[52] U.S. Cl. ............................ 432/183, 126/271.2
[51] Int. Cl. .......................... F27d 3/00, F23c 5/00
[58] Field of Search ................. 126/271.2, 271.2 A, 126/271.2 B; 263/4, 5; 266/4 F, 5 F; 432/183, 225

[56] References Cited
UNITED STATES PATENTS

| | | |
|---|---|---|
| 2,296,387 | 9/1942 | Inskeep et al. ...................... 266/5 F |
| 2,006,001 | 6/1935 | Rowe et al. ............................. 263/5 |
| 2,089,829 | 8/1937 | Feree ................................. 263/4 UX |
| 3,074,704 | 1/1963 | Ronay .................... 126/271.2 A UX |
| 3,525,326 | 8/1970 | Deal ............................ 126/271.2 A |

Primary Examiner—John J. Camby
Attorney—Harness, Dickey & Pierce

[57] ABSTRACT

A device for heating localized areas of horizontally positioned pipe is formed in two complemental semi-annular hollow sections adapted to be fitted around the pipe, the sections being hinged together at the top to open and close with respect to a vertical diametric plane for fitting upon and removal from the pipe. A plurality of gun-type burners carried by the sections are adapted to project flame and heated products of combustion around the surface of the pipe.

11 Claims, 13 Drawing Figures

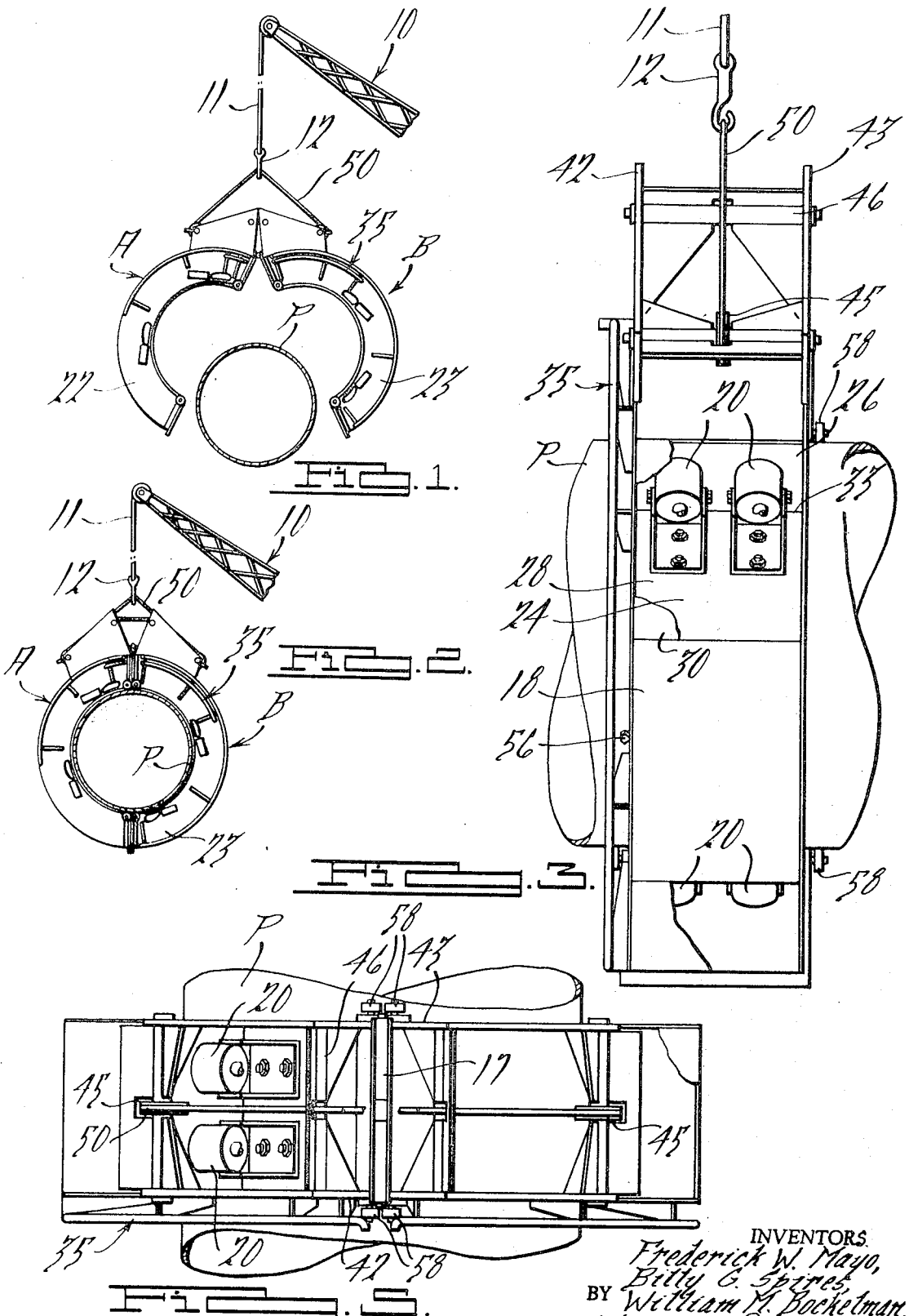

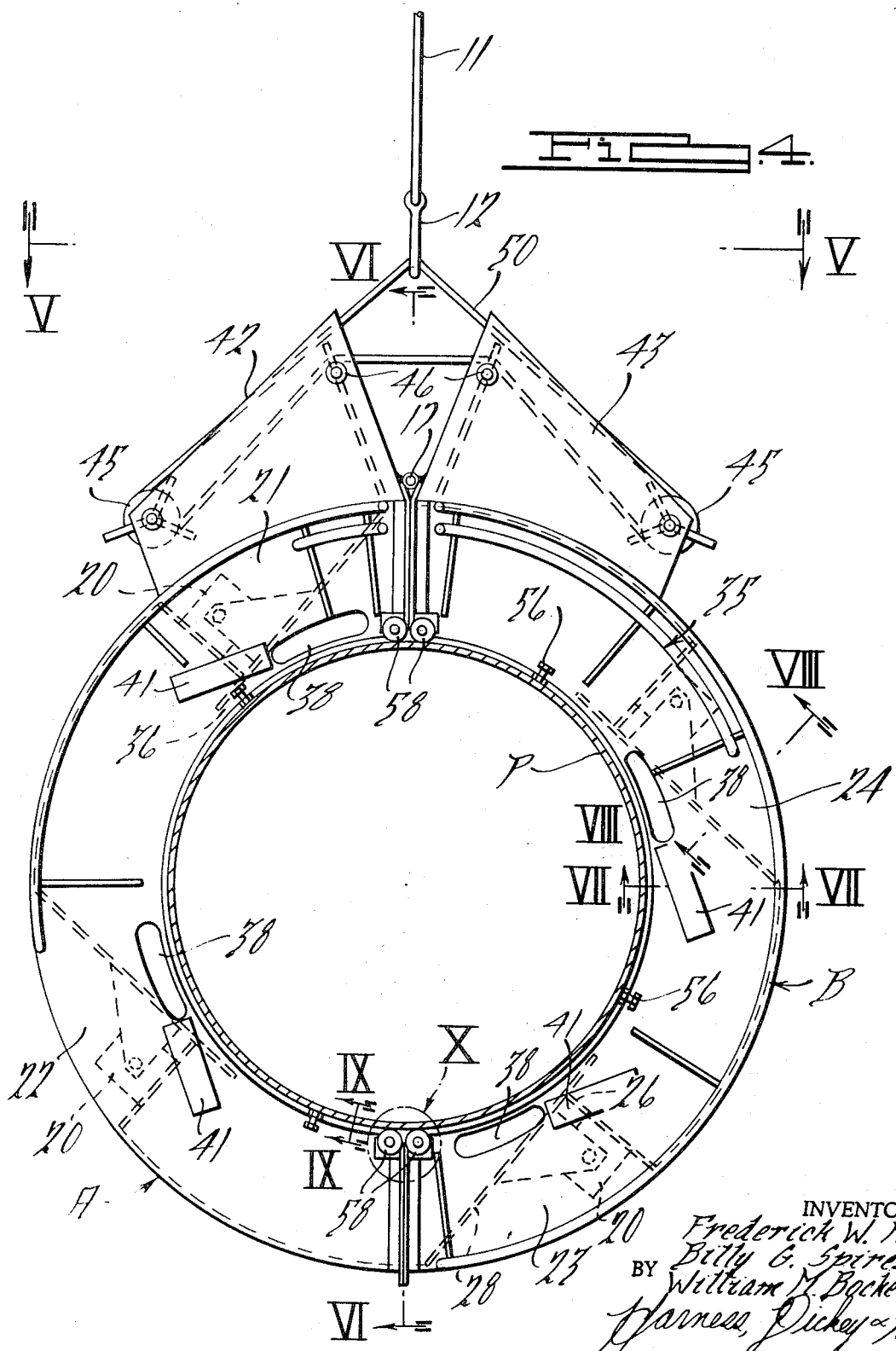

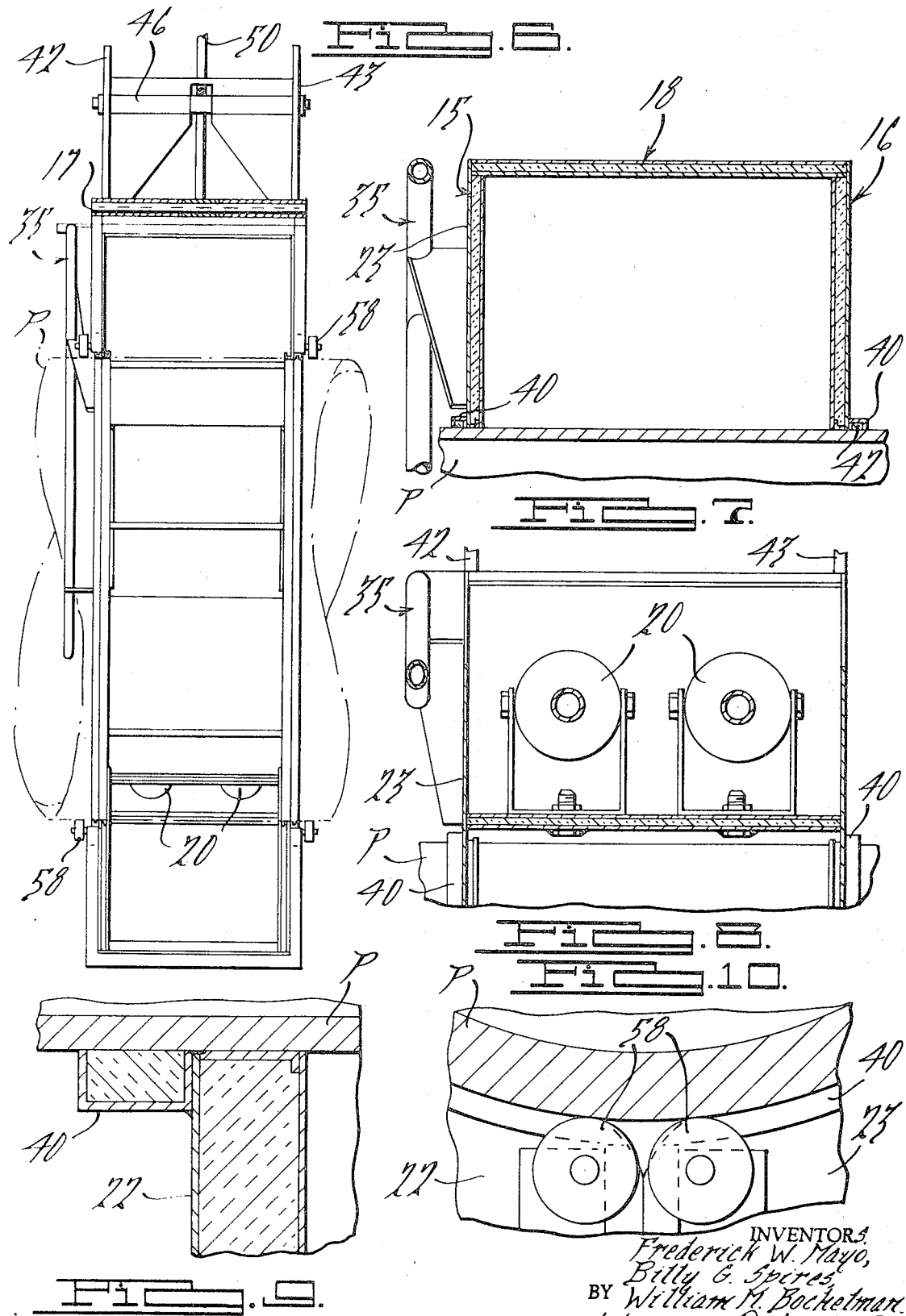

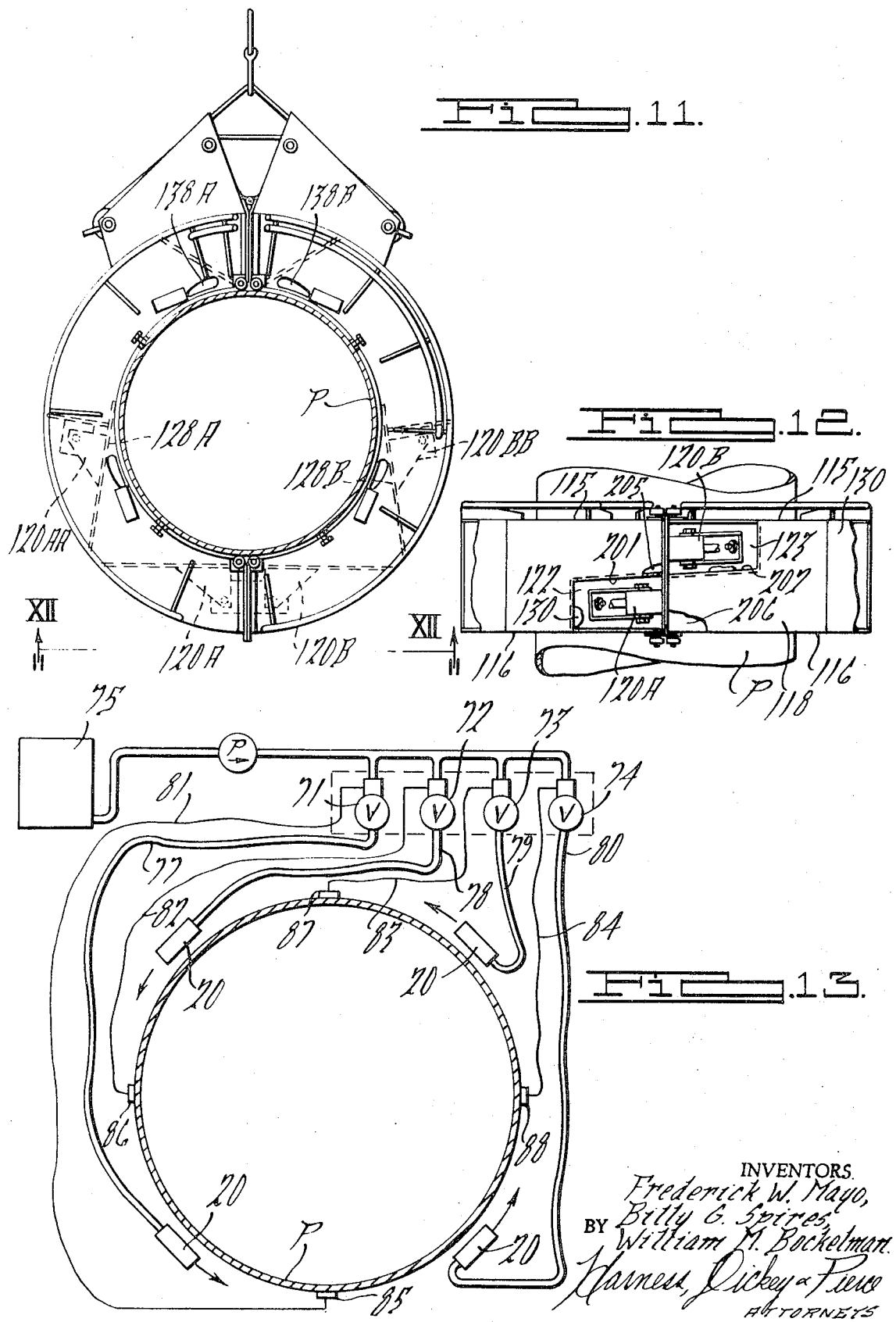

APPARATUS FOR HEATING LOCALIZED AREAS OF PIPE

BACKGROUND OF THE INVENTION

In the installation of pipelines composed of sections of large diameter pipe it is frequently necessary to heat localized areas of the pipe as for example, to preheat the abutting end parts of sections which are to be welded, or to stress relieve a welded area. It is sometimes also necessary to apply heat to the pipe and/or to the surrounding area to melt snow and ice, and/or to dry the pipe prior to welding. The overall objective of the present invention is to provide improved apparatus for performing the indicated and any other heating operations which may be required on large diameter pipe. A related object is to provide such apparatus which is relatively quick and easy to apply to and remove from pipe, which is relatively simple, inexpensive, rugged, reliable, and capable of quickly delivering large and accurately controlled volumes of heat to predetermined areas.

Other objects and advantages will become apparent upon consideration of the present disclosure in its entirety.

BRIEF DESCRIPTION OF THE FIGURES OF DRAWING

FIG. 1 is a side elevational view of heating apparatus constructed in accordance with the present invention, showing in cross-section a pipe to be heated, the heating apparatus being suspended from a crane in open position and as it appears during its application to and removal from the pipe;

FIG. 2 is a similar view showing the heating apparatus closed around the pipe;

FIG. 3 is a side elevation on a larger scale;

FIG. 4 is a sectional elevational view taken substantially on the line IV—IV of FIG. 3 and looking in the direction of the arrows;

FIG. 5 is a plan view taking substantially on the line V—V of FIG. 4 and looking in the direction of the arrows;

FIGS. 6, 7, 8 and 9 are sectional detailed views taken substantially as indicated by the lines UT—VI, VII—VII, VIII—VIII, and IX—IX of FIG. 4 and looking in the direction of the arrows;

FIG. 10 is an enlarged detail elevational view of the area within the circle designated "X" in FIG. 4;

FIG. 11 is a view similar to FIG. 4 showing a modified construction;

FIG. 12 is a bottom plan view of the embodiment of FIG. 11, and

FIG. 13 is a schematic diagram.

DETAILED DESCRIPTION OF PREFERRED FORMS OF THE INVENTION

Our preferred heating apparatus is adapted to be handled by a conventional hoisting means such as a suitable mobile crane or hoist facility, diagrammatically indicated at 10 in FIGS. 1 and 2 and having lift cable and hook means 11, 12, of conventional character. The heating apparatus consists basically of two semi-annular sections, generally designated A and B, the plane of separation of the annulus being diametric and vertical, the sections being hinged together at the top by hinge means 17. A pipe to be heated is designated P, although it will be understood that other work might be involved. Typical usage might involve heating the abutting ends of two pipe sections prior to welding and/or subsequent thereto to normalize of stress relieve the welded area.

Each of the sections A and B is formed of sheet steel and comprises two flat semi-annular double-walled side panels 15 and 16 joined by welding at their outer peripheries to a semi-cylindrical outer wall 18 which is indented inwardly from the exterior at desired areas to define pockets for the accommodation of burners 20 designed and positioned to project flame and heated gases into the interior of the annular boxlike enclosure defined by the sections and against a surrounded pipe when the sections are closed, as in FIG. 2, or to heat an area adjacent thereto, when the sections are open and positioned as depicted in FIG. 1.

In the construction shown in FIGS. 1–10, each of the sections has two burner pockets, the four pockets being designated 21, 22, 23 and 24 and positioned at approximately 90° from each other. The exact angular position can of course be varied to conform to heating requirements. Except in the areas of the burner pockets, the side walls 15, 16 and peripheral wall 18 are of double thickness, a heat-resistant insulating material such as mineral wool being interposed to confine the heat. Each burner pocket is defined by a flat axially extending radial wall 26 which extends the full distance between and is welded to the interiors of the double side panels 15 and 16, and a flat bottom wall 28, which also extends the full lateral distance between and is welded to the interiors of the side panels, and which extends in a line tangent to a circle slightly greater than the circle represented by the open inner periphery of the annulus. The outer wall 18 is interrupted in the area overlying each of the pockets and replaced by a removable cover 30.

The desired spacing between the side panels is maintained by suitable struts 32, in addition to the tranverse panels 26, 28. The transverse panels 26 are provided with openings 33 through which any back pressure within the section beyond the panel 26, considered in the direction of flame propagation, can be relieved. A pair of liquid fuel burners 20 are provided in each of the pockets, arranged to project flame through the wall 26 in a counterclockwise direction, as viewed in FIG. 4. The burners are preferably of the self-generating type, designed to burn liquid petroleum gas such as propane delivered thereto in liquid form. The liquid fuel is fed through suitable piping, generally indicated at 35, which is individual to the burners in each of the respective pockets, so that the outputs of the burners can be separately controlled to enable accurate temperatures to be achieved in desired areas of the work.

As shown schematically in FIG. 13, the control system may comprise a thermo-couple-controlled valve 71, 72, 73, 74, for regulating the fuel feed to each burner pocket. The fuel is pumped from reservoir 75 through the individual valves and via flexible supply hoses 77, 78, 79, 80, to the burner supply pipes 35 for the several burners. Flexible leads 81, 82, 83, 84 from individual thermocouples 85, 86, 87, 88 are connected to control means which is arranged to control valves 71, 72, 73, 74 respectively. The details of the control means, which may of any known suitable type, do not constitute a part of our invention. The valving and valve control elements may be carried by a suitable control cabinet or station on the mobile crane or hoist facility.

The flame and heated gases from the burners, including air drawn in through the openings 33, is projected substantially tangentially against the external wall of a surrounded pipe and upon reaching the inner surface of the sloping wall 28 of the next burner pocket can pass through a passage formed by a radial space 36 between the pipe and the forward edge of such panel 28 to mingle with the output of the next burner. A portion of the products of combustion may also escape through side orifices 38 in the walls 15, 16, such orifices being located under each of the panels 28 close to the forward extremity thereof. Orifices 38 are preferably provided with adjustable dampers 41 to enable controlling the back pressure in each of the combustion quadrants for maximum heat retention.

At its inner periphery each of the side panels carries an inwardly facing channel 40 containing an inwardly projecting compressible insulating and gasketing strip 42 adapted to rest against the external wall of the pipe when the sections are closed thereabout, to confine the flame and gases to the interior.

The apparatus is particularly useful in the construction and repair of large pipelines formed of large diameter pipe which is lying in a horizontal position. In order to enable the manipulation of such apparatus of a size and weight suitable for the indicated service, each of the sections A and B has a pair of ears 42 and 43 at its top constituting in effect upward extensions of the side panels 15 and 16 respectively and carrying pulleys 45, 46 around which sling 50 is looped by which the apparatus may be lifted and lowered. The pulleys 46 are located closer to the vertical plane of the axis of hinge 17 than the pulleys 45, but are spaced substantially above the hinge line, while the pulleys 45 are substantially angularly spaced, a distance of the order of 33+-35° from the vertical plane through the hinge axis. The sling 50 is trained over the two pulleys 46, looped under and upwardly around each of the pulleys 45, and its upper run extends upwardly from the pulleys 45 to be engaged by the hook 12. The abutting edges 52 of the panels extend upwardly from the hinge axis and angularly away from each other when the sections are closed, at an angle which limits the extent of opening of the sections to a desired angle somewhat exceeding the diameter of the pipe for which the apparatus is designed. When the sling is lifted by raising the hook from the position in which it is shown in FIGS. 2 and 4 to the position shown in FIG. 1, the sling pulls the pulleys 45 toward each other as well as upwardly, swinging the sections apart about the axis of hinge 17 until the opening is arrested by engagement of the edges 52, whereafter continued lifting permits the sections to be raised clear of the pipe or to any desired elevation for further use or movement to a new position.

Where the apparatus is being used in winter or in a cold climate, the apparatus may be used in the first instance in the open position and approximately as indicated in FIG. 1, in order to preheat a desired area, melt snow and ice, dry the pipe and the working region, etc. If a welding operation is to be performed, the sections A and B may then be closed over the areas to be welded and employed to preheat the area, then removed to permit the welding operation, whereafter it may be reapplied to the pipe in the welded area to normalize it.

Clamping screws 56 for thermocouple sensors 85, 86, 87, 88 are provided on the sides of the channels 40 at suitable positions. At the corners defined by the junctures of the upper and lower ends of the inner peripheries of the side walls and the plane of separation of the sections, rollers 58 are provided journaled on the side walls on axes parallel to the axis of the system and positioned to engage the pipe to prevent any binding which might otherwise occur due to the high unit pressure and friction when such corner areas are engaged with the pipe.

In the modified construction shown in FIGS. 11 and 12, wherein parts corresponding to those of the embodiment above described are designated by corresponding reference characters one hundred integers higher, four burners are employed. Other than the arrangement of burners, baffling and venting, the structure is essentially the same as the first embodiment and many of the parts will not require redescription.

One burner, 120A, is arranged at the bottom of the left section and discharges toward and into the right hand section. Another burner 120B is similarly located in the bottom of the right hand section discharging toward and into the left hand section. The burners 120A, 120B, are axially displaced so that neither burner interferes with the discharge from the other. Each of the burner pockets 122 and 123, for the bottom burners 120A, 120B respectively, occupies one-half the width of its section, in an axial direction, and each such pocket is defined on the inner side by a central partitioning wall 201, 202. Central walls 201, 202 extend to the free open ends of their respective sections and abut one another when the sections are closed, and the spaces between each such wall and the sidewall 115, 116 farther from the pocket, define passages 205, 206 through which the burner discharge flows into the other section. Passages 205, 206 are covered by the insulated outer wall portions 118, and the partitioning central walls 201, 202 are also double and insulated, the burner pockets 122, 123 being open to the exterior and conforming in this and other respects to the burner pockets previously described. Preferably the partitioning walls and the burners 120A, 120B are inclined in an axial direction so that the burners discharge toward the central plane of the apparatus and to minimize flame impingement against the partitioning walls, as shown in FIG. 12.

The discharges from burners 120A, 120B are guided upwardly within the right and left sections respectively and under the inclined walls 128B, 128A, respectively which are mounted and inclined similarly to walls 28 previously described, although wall 128A inclines inwardly toward lesser radius in an upward direction and the burner 120AA is mounted on the upper side thereof and discharges in a clockwise direction while the wall 128B supports its burner 120BB to discharge counterclockwise and upwardly in the opposite angular direction. The outputs of all four burners of this embodiment are thus all guided upwardly in the direction of natural draft. The gases from the bottom burners 120A, 120B may pass into the upper burner chambers through the radial spacing between the work and the inner edges of panels 128A, 128B. Outlet ports 138A, 138B in the upper areas of the sidewalls permit escape of the products of combustion. In this embodiment the upper burners 120AA and 120BB are located approximately on a horizontal diameter of the annulus, although as noted previously the positioning of the burners can be varied in accordance with heating requirements.

This Detailed Description of Preferred Forms of the Invention, and the accompanying drawings, have been furnished in compliance with the statutory requirement to set forth the best mode contemplated by the inventors of carrying out the invention. The prior portions consisting of the "Abstract of the Disclosure" and the "Background of the Invention" are furnished without prejudice to comply with administrative requirements of the Patent Office.

What is claimed is:

1. Means for heating localized peripheral area of pipe or the like, comprising a plurality of complemental annular segmental inwardly opening box-like sections proportioned to closely surround the pipe, and a plurality of substantially tangentially discharging burners carried by said sections and arranged to discharge flame into the interior thereof, said sections having walls for guiding the flame and products of combustion around and close to the periphery of such a pipe, characterized by a pair of such sections, each of semi-annular form, separated upon a substantially vertical diametric axial plane, the sections being hinged together at the top and separable at the bottom, and grappling means for imposing a lifting force on each of said sections at positions on opposite sides of the hinged position whereby the sections may be supported in the open condition.

2. Heating means as defined in claim 1 including means for lifting and for controlling the opening and closing movement of said sections comprising combined lifting and abutment ears carried at the top of said sections, and sling means engageable with said ears for lifting and opening the same.

3. Heating means as defined in claim 1 including cable retaining means carried by said sections at positions uniformly angularly spaced from the hinge axis whereby the sections may be simultaneously lifted and opened.

4. Means for heating localized peripheral area of pipe or the like, comprising a plurality of complemental annular segmental inwardly opening box-like sections proportioned to closely surround the pipe, and a plurality of substantially tangentially discharging burners carried by said sections and arranged to discharge flame into the interior thereof, said sections having walls for guiding the flame and products of combustion around and close to the periphery of such a pipe, characterized by burners which are offset angularly from one another and which discharge toward one another in opposite angular directions, said burners being axially displaced so that the discharges of said burners may pass each other in axially displaced regions.

5. Means for heating localized peripheral area of pipe or the like, comprising a plurality of complemental annular segmental inwardly opening box-like sections proportioned to closely surround the pipe, and a pair of substantially tangentially discharging axially offset burners carried by said sections and arranged to discharge flame in opposite angular directions into the interior thereof, said sections having walls for guiding the flame and products of combustion around and close to the periphery of such a pipe, characterized by a pair of burners offset axially from each other and discharging in opposite angular directions.

6. Heating means as defined in claim 5 including wall portions spaced from the axial ends of said sections for guiding the discharges of said burners past each other.

7. Heating means as defined in claim 4 including wall portions spaced from the axial ends of said sections for isolating the discharges of said burners in the passing regions.

8. Heating means as defined in claim 5 wherein said burners are offset axially and angularly from one another and discharge toward one another in opposite angular directions whereby the discharges thereof may pass one another in axially offset paths.

9. Heating means as defined in claim 5 wherein said burners are offset angularly from one another and discharge toward one another in opposite angular directions, said directions being axially displaced so that the discharges of said burners may pass each other in axially displaced regions, and controllable escape openings in the side walls of side combustion chambers located close to said restricted areas of communication.

10. Means for heating localized peripheral area of pipe or the like, comprising a plurality of complemental annular segmental inwardly opening box-like sections proportioned to closely surround the pipe, and a plurality of substantially tangentially discharging burners carried by said sections and arranged to discharge flame into the interior thereof, said sections having walls for guiding the flame and products of combustion around and close to the periphery of such a pipe, characterized by burners arranged at angularly spaced positions in said sections and discharging in the same angular direction into the interior thereof and means dividing said sections into a plurality of angularly spaced combustion areas communicating with each other through relatively restricted passages located at the inner periphery thereof, each of said sections having controllable lateral vents located relatively close to said passages.

11. Heating means as defined in claim 1 wherein each of said sections incorporates at least one of said vents on each axial side, and a separate damper for controlling each vent.

* * * * *

UNITED STATES PATENT OFFICE
CERTIFICATE OF CORRECTION

Patent No. 3,776,689      Dated  Dec. 4, 1973

Inventor(s)  Frederick W. Mayo et al

It is certified that error appears in the above-identified patent and that said Letters Patent are hereby corrected as shown below:

Col. 1, line 44, delete "UT-VI," and insert --VI-VI,--.
Col. 2, line 3,  delete "of" and insert --or--.
Col. 3, line 39, delete "33+-35°" and insert --33-35°--.

Signed and sealed this 16th day of April 1974.

(SEAL)
Attest:

EDWARD M.FLETCHER,JR.            C. MARSHALL DANN
Attesting Officer                Commissioner of Patents